(12) United States Patent
Kim et al.

(10) Patent No.: US 10,998,942 B2
(45) Date of Patent: May 4, 2021

(54) HYBRID BEAM FORMING-BASED OPEN-LOOP MIMO TRANSMISSION METHOD AND APPARATUS THEREFOR

(71) Applicant: Samsung Electronics Co., Ltd, Gyeonggi-do (KR)

(72) Inventors: Taeyoung Kim, Gyeonggi-do (KR); Jiyun Seol, Gyeonggi-do (KR); Chanhong Kim, Gyeonggi-do (KR); Jaeyoel Kim, Gyeonggi-do (KR); Hyunjung Kim, Gyeonggi-do (KR); Inhak Na, Gyeonggi-do (KR); Jiyeon Han, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/100,281

(22) PCT Filed: Nov. 26, 2014

(86) PCT No.: PCT/KR2014/011435
§ 371 (c)(1),
(2) Date: May 27, 2016

(87) PCT Pub. No.: WO2015/080471
PCT Pub. Date: Jun. 4, 2015

(65) Prior Publication Data
US 2017/0005710 A1    Jan. 5, 2017

(30) Foreign Application Priority Data

Nov. 27, 2013  (KR) .......................... 10-2013-0145713
Sep. 25, 2014  (KR) .......................... 10-2014-0128399

(51) Int. Cl.
*H04B 7/0417*    (2017.01)
*H04B 7/0456*    (2017.01)
(Continued)

(52) U.S. Cl.
CPC ......... *H04B 7/0417* (2013.01); *H04B 7/0408* (2013.01); *H04B 7/0456* (2013.01);
(Continued)

(58) Field of Classification Search
USPC ........................................................ 375/267
See application file for complete search history.

(56) References Cited

U.S. PATENT DOCUMENTS 8,139,535 B2 * 3/2012 Hsuan .................. H04W 24/02
                                                     370/329
8,730,897 B2    5/2014 Kim et al.
(Continued)

FOREIGN PATENT DOCUMENTS

EP    1780968 A1    5/2007
EP    2352244 A1    8/2011
(Continued)

OTHER PUBLICATIONS

International Search Report dated Feb. 11, 2015 in connection with International Patent Application No. PCT/KR2014/011435, 5 pages.
(Continued)

*Primary Examiner* — Shuwang Liu
*Assistant Examiner* — Gina M McKie

(57) ABSTRACT

A method for a transmitter of a mobile communication system transmitting and receiving signals according to an embodiment of the present specification comprises the steps of: transmitting to a receiver system information for transmitting a signal to the receiver including a connection between a wireless resource and a transmitting antenna; transmitting a reference signal to the receiver based on the system information; and receiving from the receiver feedback information generated based on the reference signal. According to an embodiment of the present specification, in a beamforming transmission method of a mobile commu-
(Continued)

nication system, a transmitter can determine whether to perform digital pre-coding without advance information from a receiver and can consequently perform a transmission, and can thereby perform lower-overhead and efficient signal transmission/reception.

20 Claims, 13 Drawing Sheets

(51) Int. Cl.
  *H04L 5/00* (2006.01)
  *H04B 7/08* (2006.01)
  *H04B 7/06* (2006.01)
  *H04B 7/0408* (2017.01)
  *H04W 16/28* (2009.01)

(52) U.S. Cl.
  CPC ......... *H04B 7/0617* (2013.01); *H04B 7/0619* (2013.01); *H04B 7/0639* (2013.01); *H04B 7/0691* (2013.01); *H04B 7/088* (2013.01); *H04L 5/0023* (2013.01); *H04L 5/0048* (2013.01); *H04W 16/28* (2013.01); *H04B 7/0669* (2013.01); *H04B 7/0671* (2013.01); *H04L 5/0016* (2013.01)

(56) References Cited

U.S. PATENT DOCUMENTS

| | | | | |
|---|---|---|---|---|
| 8,971,261 | B2* | 3/2015 | Nam | H04L 1/0025 370/329 |
| 2007/0105503 | A1* | 5/2007 | Kim | H04L 1/0656 455/70 |
| 2007/0191066 | A1* | 8/2007 | Khojastepour | H04B 7/0408 455/562.1 |
| 2009/0318178 | A1* | 12/2009 | Nogami | H04B 7/0671 455/517 |
| 2011/0274067 | A1* | 11/2011 | Lee | H04B 7/0413 370/329 |
| 2012/0108254 | A1 | 5/2012 | Kwon et al. | |
| 2012/0127961 | A1* | 5/2012 | Kawamura | H04L 5/001 370/335 |
| 2013/0182594 | A1 | 7/2013 | Kim et al. | |
| 2013/0242896 | A1 | 9/2013 | Son et al. | |
| 2013/0258894 | A1 | 10/2013 | Ogawa et al. | |
| 2013/0258972 | A1 | 10/2013 | Kim et al. | |
| 2013/0295852 | A1 | 11/2013 | Kim et al. | |
| 2013/0301454 | A1 | 11/2013 | Seal et al. | |
| 2013/0308714 | A1* | 11/2013 | Xu | H04B 7/0417 375/267 |
| 2013/0342987 | A1* | 12/2013 | Yang | G06F 1/20 361/679.32 |
| 2014/0073337 | A1* | 3/2014 | Hong | H04W 16/28 455/452.1 |
| 2015/0282123 | A1* | 10/2015 | Miao | H04L 5/0051 455/450 |
| 2016/0241323 | A1* | 8/2016 | Ko | H04B 7/06 |
| 2018/0241502 | A1* | 8/2018 | Beale | H04L 1/0015 |
| 2019/0260517 | A1* | 8/2019 | Liu | H04W 72/1247 |
| 2019/0265347 | A1* | 8/2019 | Wintermantel | G01S 13/42 |

FOREIGN PATENT DOCUMENTS

| | | |
|---|---|---|
| EP | 2557749 A2 | 2/2013 |
| KR | 10-2010-0138261 | 12/2010 |
| KR | 10-2011-0011524 | 2/2011 |
| KR | 10-2013-0084007 A | 7/2013 |
| KR | 10-2013-0106260 | 9/2013 |
| KR | 10-2013-0110396 A | 10/2013 |
| KR | 10-2013-0124004 | 11/2013 |
| KR | 10-2013-0127347 | 11/2013 |

OTHER PUBLICATIONS

Written Opinion of the International Searching Authority dated Feb. 11, 2015 in connection with International Patent Application No. PCT/KR2014/011435, 5 pages.
Foreign Communication from Related Counterpart Application; European Patent Application No. 14865578.0; Extended European Search Report dated Jun. 20, 2017; 8 pages.
Communication pursuant to Article 94(3) EPC dated Dec. 11, 2019 in connection with European Patent Application No. 14 865 578.0, 7 pages.
Office Action dated Feb. 22, 2021 in connection with Korean Patent Application No. 10-2014-0128399, 11 pages.

* cited by examiner

HYBRID BEAM FORMING-BASED OPEN-LOOP MIMO TRANSMISSION METHOD AND APPARATUS THEREFOR

CROSS-REFERENCE TO RELATED APPLICATION(S)

The present application claims priority under 35 U.S.C. § 365 to International Patent Application No. PCT/KR2014/011435 filed Nov. 26, 2014, entitled "HYBRID BEAM-FORMNG-BASED OPEN-LOOP MIMO TRANSMISSION METHOD AND APPARATUS THEREFOR", and, through International Patent Application No. PCT/KR2014/011435, to Korean Patent Application No. 10-2013-0145713 filed Nov. 27, 2013 and to Korean Patent Application No. 10-2014-0128399 filed Sep. 25, 2014, each of which are incorporated herein by reference into the present disclosure as if fully set forth herein.

TECHNICAL FIELD

The present invention relates to a method for transmitting/receiving signals using a plurality of antennas in a wireless communication system. In more detail, the present invention relates to a method and apparatus for controlling Open-Loop Multiple-Input Multiple Output (MIMO) transmission in a hybrid beamforming structure for transmitting/receiving signals with the plural antennas.

BACKGROUND ART

Wireless communication systems have evolved in a way of increasing data rate for meeting the gradually increasing wireless data traffic demand.

The research and development activities for the 4G systems have been focused on the improvement of spectral efficiency to increase data rate, but the exponentially growing wireless data traffic demand may not be met through only spectral efficiency improvement.

One approach to solve this problem is to use a very broad frequency band which cannot be secured in the frequency spectrum (<5 GHz) in use by current cellular mobile communication systems but can be secured in higher frequency spectrum.

Meanwhile, the higher the transmission frequency, the greater the radio wave propagation loss. The increased radio wave propagation loss decreases wave propagation distance, resulting in reduction of service coverage. Therefore, there is a need of a method and apparatus for transmitting/receiving signals efficiently in a broadband frequency.

DISCLOSURE OF THE INVENTION

Technical Problem

Beamforming is one of the key technologies to solve the above problem, i.e. to mitigate the radio wave propagation loss and increase the radio wave propagation distance. The present invention aims to provide an Open-Loop beamforming operation algorithm and transmission method and apparatus for transmitting data using multiple antennas without information for use in selecting a digital precoder which is transmitted by a receiver in a beamforming-based mobile communication system. In more detail, the present invention may be applied to a beamforming-based mobile communication system operating in an ultra-high frequency band.

Solution to Problem

In accordance with an aspect of the present invention, a signal transmission/reception method of a transmitter of a mobile communication system includes transmitting to a receiver system information including mapping relationship between radio resources and transmission antennas for transmitting a signal to the receiver, transmitting a reference signal to the receiver based on the system information, and receiving feedback information generated based on the reference signal from the receiver.

In accordance with another aspect of the present invention, a signal transmission/reception method of a receiver of a mobile communication system includes receiving system information from a transmitter, the system information including mapping relationship between radio resources and transmission antennas for receiving a signal from the transmitter, receiving a reference signal from the transmitter based on the system information, and transmitting to the transmitter feedback information generated based on the reference signal.

In accordance with another aspect of the present invention, a transmitter for communicating signals in a mobile communication system includes a transceiver which has a plurality of transmission antennas and communicates signals with a receiver and a control unit which controls the transceiver to transmit to a receiver system information including mapping relationship between radio resources and transmission antennas for transmitting a signal to the receiver, to transmit a reference signal to the receiver based on the system information, and to receive feedback information generated based on the reference signal from the receiver.

In accordance with still another aspect of the present invention, a receiver for communicating signals in a mobile communication system includes a transceiver which communicates signals with a transmitter including a plurality of transmission antennas and a control unit which controls the transceiver to receive system information from a transmitter, the system information including mapping relationship between radio resources and transmission antennas for receiving a signal from the transmitter, to receive a reference signal from the transmitter based on the system information, and to transmit to the transmitter feedback information generated based on the reference signal.

Advantageous Effects of Invention

The beamforming transmission method of a mobile communication system according to the present invention is advantageous in terms of low overheads and high signal transmission/reception efficiency because the transmitter determines a digital precoder without information from the receiver.

MODE FOR THE INVENTION

Figure 1:
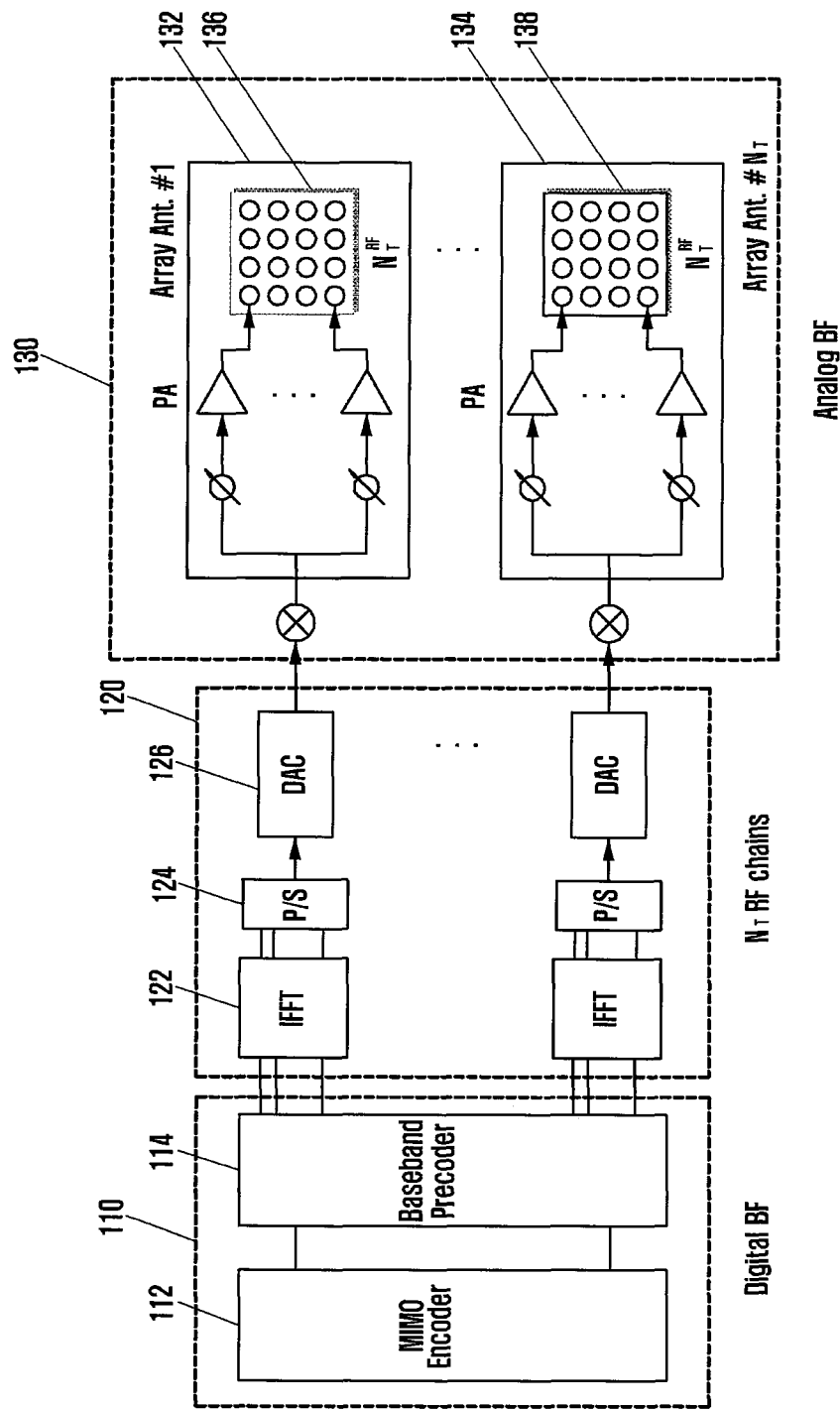
FIG. 1 is a diagram illustrating a configuration of an ultra-high frequency band beamforming transmitter.

Exemplary embodiments of the present invention are described with reference to the accompanying drawings in detail.

Descriptions on the technical details well-known in the art and not related directly to the present disclosure are omitted herein. This aims to omit unnecessary description so as to make clear the subject matter of the present invention.

For the same reason, some of elements are exaggerated, omitted, or simplified in the drawings, and in practice the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings; however, the present invention may be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

According to an embodiment, transmission beamforming is a method of focusing signals transmitted from a plurality of antennas in a specific direction. Such an arrangement of plural antennas is referred to as an array antenna, and individual antennas of the arrangement are referred to as antenna elements. Using transmission beamforming, it is possible to increase the propagation distance of a signal and mitigate interference to other users because the signal is radiated in an intended direction but almost not in other directions.

It may also be possible for the receiver to perform reception beamforming with a reception array antenna which focuses reception of the radio wave in a specific direction to increase the signal reception sensitivity and rule out the signal being received in other directions, thereby canceling interference.

By arranging the antenna elements at a distance of half the radio wavelength, which decreases as the transmission frequency increases, it is possible to configure the array antenna with more antenna elements in a given space. That is, if signal transmission is performed by the use of beamforming in a communication system operating in a high frequency band, it may be possible to achieve higher antenna gain in comparison with the case of using the beamforming in a communication system operating in a low frequency band. This means that the beamforming technique is capable of improving communication efficiency of the communication system operating in a high frequency band.

In an embodiment, it may be considered to apply the digital precoding, which is used for high data rate communication in the legacy multi-antenna systems, along with the analog beamforming technology to achieve high antenna gain or to apply a hybrid beamforming technology which combines two technologies, i.e. the analog beamforming and digital precoding.

According to an embodiment, it may be possible to expect improvement in signal reception reliability and system throughput by applying digital precoding that is similar to that applied on the baseband in the legacy multi-antenna system when one or more analog beams are formed through analog beamforming.

An embodiment of the present invention proposes a high performance/low complexity analog beam selection and digital precoder determination method for use in an ultra-high frequency beamforming technology-based mobile communication system. In order to accomplish this, the present invention proposes a new channel measurement method and a channel codebook design method for use by a terminal.

According to an embodiment of the present invention, the ultra-high frequency band beamforming system includes a hybrid beamforming structure comprised of an analog beamforming unit and a digital precoding unit.

FIG. 1 is a diagram illustrating a configuration of an ultra-high frequency band beamforming transmitter.

Referring to FIG. 1, the transmitter includes a digital beamforming unit 110, an RF Chain 120, an analog beamforming unit 130.

The digital beamforming unit 110 may include a MIMO Encoder 112 and a Baseband Precoder 114. The MIMO Encoder 112 performs encoding for transmitting signals using a plurality of antennas, and the Baseband Precoder 114 performs precoding on baseband signals.

The RF Chain may include $N_T$ Inverse Fast Fourier Transformers (IFFT) 122, a Parallel-to-Serial (P/S) converter 124, and a Digital-Analog Converter (DAC) 126.

The analog beamforming unit 130 includes $N_T$ array antennas, of which each 136 (or 138) includes $N_t^{RF}$ antenna elements, to perform analog beamforming on the transmission signals carrying data.

Each array antenna may form an analog beam in any of all directions within a service area and, according to an embodiment, the direction of the analog beam may be predetermined. By transmitting channel measurement reference signals to which the predetermined analog beams are applied, it is possible for the terminals to select the respective analog beams directed thereto. According to an embodiment, because the predetermined analog beams carry different channel measurement reference signals, each terminal may select the analog beam addressed to it based on the information including channel measurement signal reception strength.

According to an embodiment, because the beamforming structure includes a plurality of array antennas that are capable of forming per-array antenna analog beams, it may be possible to select the analog beam per array antenna. In detail, it is possible to select the analog beams per array antenna. It may also be possible to configure some array antennas to form one analog beam and other array antennas to form another analog beam.

According to an embodiment, because multiple array antennas are used to form a plurality of analog beams through beamforming, it is possible to apply digital precoding at the baseband. The digital precoding can be categorized into Open-Loop precoding and Closed-Loop precoding.

The Closed-Loop precoding technique is characterized in that a receiver receives a specific signal and acquires channel information from the received signal to determine a preferred precoding vector based on the channel information. A transmitter transmits signals in the precoding scheme determined based on the preferred precoding vector received from the receiver. The most popular Closed-Loop precoding method is a codebook-based precoding. In the above embodiment, since $N_T$ array antennas are given, the preferred precoding vector is selected from the $N_T^{th}$ order digital codebook based on the channel measurement reference signals. In more detail, it may be possible to select a precoding vector suitable for the receiver from a digital codebook predetermined based on the channel measurement information received from the receiver.

Meanwhile, the Open-Loop precoding technique is characterized in that the transmitter determines the precoding vector for use in transmitting signals without assistance of the receiver. That is, a predetermined precoding vector is commonly used regardless of user or channel; thus, there is no need to receive feedback from the receiver. For example, in the case that the transmitter having no communication link with the receiver needs to transmit data to a plurality of receivers, it is possible to transmit the signal using the Open-Loop precoding technique.

Embodiments of the present invention propose Open-Loop precoding-based signal transmission/reception methods which are capable of performing precoding operation without information related to precoding determination from the receiver. However, the present invention is not limited to the Open-Loop precoding-based system and may be applied also to the Closed-Loop precoding-based system.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention and may vary according to the intention of a user or an operator, usage, etc. Therefore, the definition should be made on the basis of the overall content of the present specification.

First, a description is made of the necessity and purpose of the Open-Loop MIMO technique. The beamforming-based Open-Loop MIMO transmission method according to an embodiment of the present invention is a multi-antenna transmission technique for a transmitter to transmit data without channel information feedback from one or more receivers. In this case, any channel condition or data type-based channel information is not fed back. In an exemplary case where a user is located at a cell edge or coverage hole, it is difficult for the receiver either to measure the channel accurately or to transmit measured channel information to the transmitter because of the bad channel condition.

If inaccurate channel information is transmitted through the feedback channel having low transmission reliability, this may cause significant performance degradation. Thus the Open-Loop MIMO transmission technique, which operates without channel information, may be more efficient to transmit data and control information.

In another exemplary case where the user is in the initial access stage, it is not yet possible to transmit data in uplink. In this case, since the uplink channel is not established yet, no matter how accurately the channel measurement is performed in a good channel condition area or how reliable is the measurement information feedback, the receiver cannot transmit any channel information to the transmitter. Thus the Open-Loop MIMO transmission technique is more effective to establish a communication link between the base station and terminal.

Open-Loop MIMO Transmission Algorithm for Beamforming System

The Open-Loop MIMO transmission technique which is usually used in mobile communication systems may be designed in consideration of a Space-Time Block Coding scheme and Cyclic Delay Diversity CDD) scheme adopting antenna-specific time delays or an Open-Loop precoding scheme using a digital precoder predetermined without discerning between channels or users.

An embodiment of the present invention proposes an Open-Loop MIMO transmission technique which is effective and suitable for the system structure such as a beamforming-based mobile communication system. An example of the beamforming-based Open-Loop MIMO transmission technique is the aforementioned STBC-based multi-antenna transmission technique and beamforming technique. That is, by replacing the Baseband Precoder 114 with an STBC precoder, it is possible to implement an STBC-based MIMO transmission technique.

An embodiment of the present invention further proposes an antenna Cycling-based analog beam transmission technique in addition to the STBC-based transmission technique.

Open-Loop MIMO Transmission Algorithm for Hybrid Beamforming Structure

The hybrid beamforming-based Open-Loop MIMO transmission technique proposed in an embodiment of the present invention is performed in such a way of transmitting the information on the Open-Loop transmission scheme to be applied to the users within the coverage area of the serving base station by means of system information, determining array antenna-specific analog beams based on the shared information in channel measurement, and mapping the beams to the frequency regions for transmitting data according to predetermined antenna selection patterns and cycles.

Figure 2:
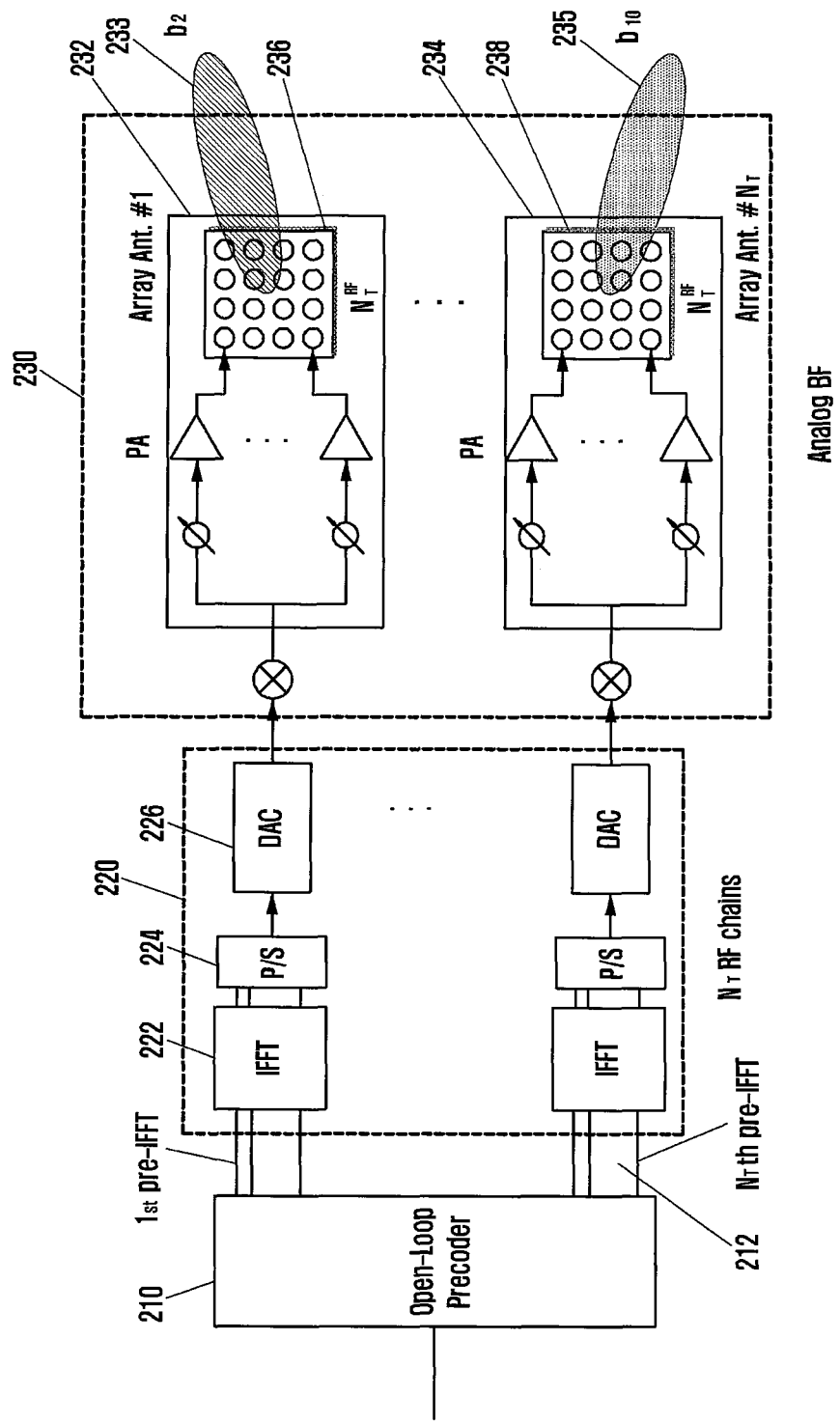
FIG. 2 is a diagram illustrating a configuration of an Open-Loop MIMO transmitter for use in a hybrid beamforming structure according to an embodiment of the present invention.

FIG. 2 is a diagram illustrating a configuration of an Open-Loop MIMO transmitter for use in a hybrid beamforming structure according to an embodiment of the present invention.

Referring to FIG. 2, the transmitter of an embodiment may include an Open-Loop Precoder 210, an RF Chain 220, and an analog beamforming unit 230. The transmitter may include a base station. The base station may be referred to as a serving base station hereinafter.

The Open-Loop Precoder 210 may perform precoding in an Open-Loop scheme according to an embodiment.

The RF Chain may include Inverse Fast Fourier Transformers (IFFT) 222, a Parallel-to-Serial (P/S) converter 224, and a Digital-Analog Converter (DAC) 226.

The analog beamforming unit 230 includes $N_T$ array antennas, of which each 236 (or 238) includes $N_t^{RF}$ antenna elements, to perform analog beamforming on the transmission signals carrying data as denoted by reference numbers 233 and 235.

According to an embodiment, the base station may include a transceiver for transmitting/receiving to/from terminals or other base stations and a control unit for controlling the transceiver to transmit the signals to the terminals. In an embodiment, the Open-Loop Precoder 210, the RF Chain, and the Beamforming unit operate under the control of the control unit.

An embodiment proposes a hybrid beamforming-based Open-Loop MIMO transmission structure for transmitting a single stream.

The transmitter of an embodiment includes the Open-Loop Precoder 210 instead of the Baseband Precoder 114 of FIG. 1, and the role of the Open-Loop Precoder 210 is described later. In an embodiment, it is assumed that the transmitter is capable of receiving preferred analog beam information per antenna from the users located within the coverage of the serving base station. The preferred analog beam selection/determination procedure is described later with reference to FIG. 5.

In summary, the receiver selects a preferred analog beam based on the information on the channels measured in the frequency resource region allocated per transmission antenna. The receiver transmits the selected analog beam information to the corresponding serving base station, which determines the analog beams and configures phase shift values for the respective antennas based on the information. The transmitter may transmit the signals carrying data to the receiver based on the determined analog beams and configured phase shift values.

According to an embodiment, it may also be possible to configure the antennas to form an analog beam in the same direction in the hybrid beamforming structure.

As described above, it is possible to transmit data by means of multiple antennas through a process of mapping the selected per-antenna analog beams to the predetermined per-antenna frequency resource regions. This operation is referred to as antenna Cycling transmission technique on the basis of mapping between frequency resource regions and antennas. A description is made of the mapping and transmission method in association with the frequency region allocated per antenna at pre-IFFT node 212.

Figure 3:
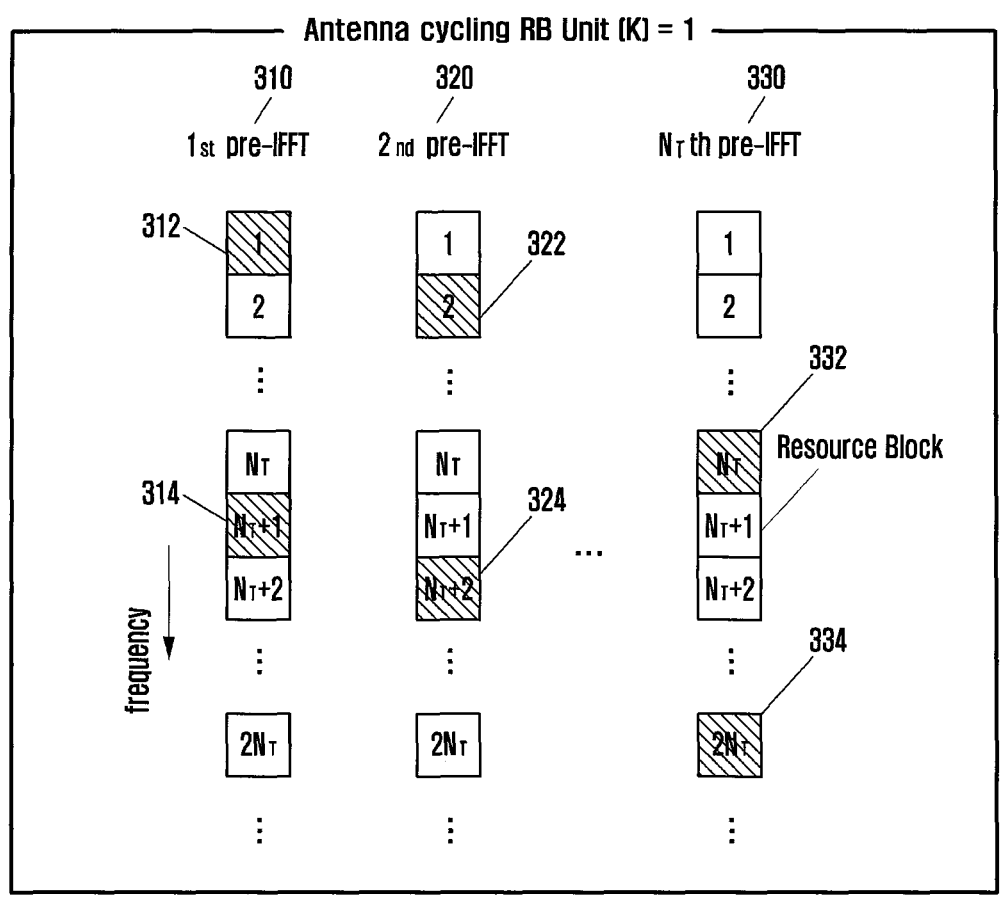
FIG. 3 is a diagram illustrating the transmission antenna Cycling in unit of Resource Block (RB) according to an embodiment.
Figure 4:
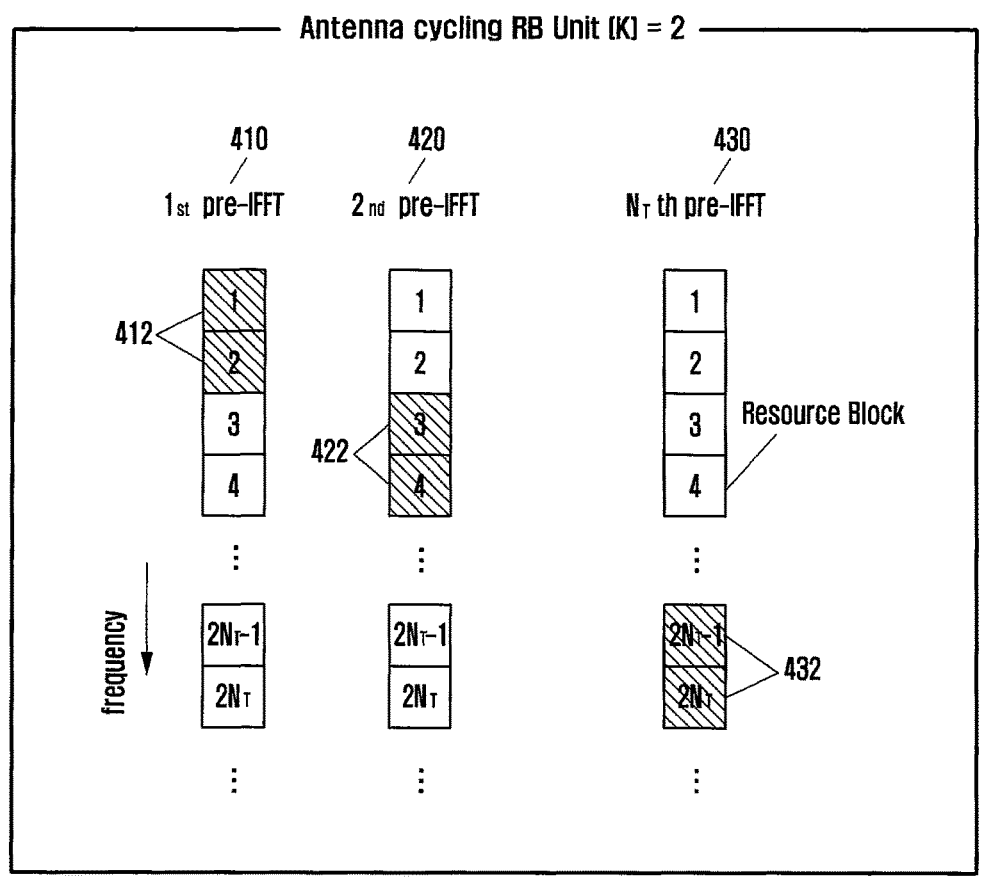
FIG. 4 is a diagram illustrating the transmission antenna Cycling in unit of 2 RBs according to another embodiment.

FIGS. 3 and 4 show positions of frequency resource regions allocated for respective transmission antennas at the pre-IFFT node according to an embodiment. FIG. 3 is a diagram illustrating the transmission antenna Cycling in unit of Resource Block (RB) according to an embodiment, and FIG. 4 is a diagram illustrating the transmission antenna Cycling in unit of 2 RBs according to another embodiment. Here, RB denotes a resource allocation unit consisting of consecutive symbols on the time axis and consecutive subcarriers on the frequency axis.

In the embodiment of FIG. 3, a hybrid beamforming structure consisting of $N_T$ transmission array antennas is assumed as shown in FIG. 2, and the transmission antenna changes by RB according to the antenna Cycling unit of 1 RB. In detail, each transmission antenna is mapped to the transmission resource according to the Cycling unit. Although the description is directed to a case where the transmission antenna is mapped to the transmission resource, it may also be possible to map a plurality of antenna modules to transmission resources.

The RB frequency resource positions 312 and 314 allocated at the first pre-IFFT node 310 as the first array antenna can be expressed as follows:

$$(k-1) \bmod N_T = 0, k=1,2,\ldots,N_{RB}$$

Here, $N_{RB}$ denotes a total number of RBs, and k denotes an RB index. This may be generalized such that the RB frequency resource positions 332 and 334 allocated to the $n^{th}$ array antenna corresponding to the $n^{th}$ pre-IFFT node 330 can be expressed as follows:

$$(k-1) \bmod N_T = n-1, k=1,2,\ldots, N_{RB}$$

The above equation gives the RB frequency resource positions mapped to the transmission antenna when the antenna Cycling unit is 1 RB, i.e. when K=1 is assumed. The Open-Loop MIMO transmission method proposed in the present invention is a technique to transmit data, changing the array antenna by K RBs as the antenna Cycling unit and repeating all the array antennas cyclically.

In the embodiment of FIG. 4, a hybrid beamforming structure consisting of $N_T$ transmission array antennas is assumed, and the transmission antenna changes by 2 RBs, i.e. the antenna Cycling unit is 2 RBs.

As shown in FIG. 4, the RB frequency resource position 412 allocated at the first pre-IFFT 410 corresponding to the first array antenna can be expressed as follows:

$$(\mathrm{floor}(k/2)-1) \bmod N_T = 0, k=1,2,\ldots, N_{RB}$$

Here, floor(x) is a function for removing the digits after the decimal point of integer x. This may be generalized in consideration of the antenna cycling unit K such that the RB frequency resource position 432 allocated to the $n^{th}$ array antenna corresponding to the $n^{th}$ pre-IFFT 430 can be expressed as follows:

$$(\mathrm{floor}(k/K)-1) \bmod N_T = n-1, k=1,2,\ldots, N_{RB}.$$

The Open-Loop MIMO transmission method proposed in an embodiment of the present invention includes a method for determining the mapping relationship between antennas and frequency resource regions according to the antenna Cycling unit value. The antenna Cycling unit may change depending on the embodiment, and plural base stations may share the selected Cycling information for communication based thereon. It may also be possible to select the Cycling unit based on the signals communicated previously among the base stations and to perform Open-Loop MIMO transmission based thereon.

In an embodiment, the base station may determine the Cycling unit based on the channel condition between the terminal and the base station. In detail, if the channel condition between the terminal and the base station is variable, it may be preferable to set the Cycling unit to a small value; otherwise if the channel condition is invariable, it may be preferable to set the Cycling unit to a large value. If the channel condition between the base station and the terminal does not change significantly depending on the frequency, it may be preferable to set the Cycling unit to a large value; otherwise if the channel condition between the base station and the terminal changes significantly, it may be preferable to set the Cycling unit to a small value. According to an embodiment, the base station having a small radius is likely to experience little channel variation including delay spread; thus, it is preferable to set the Cycling unit to a large value and to decrease the Cycling unit as the cell radius of the base station increases.

Figure 5:
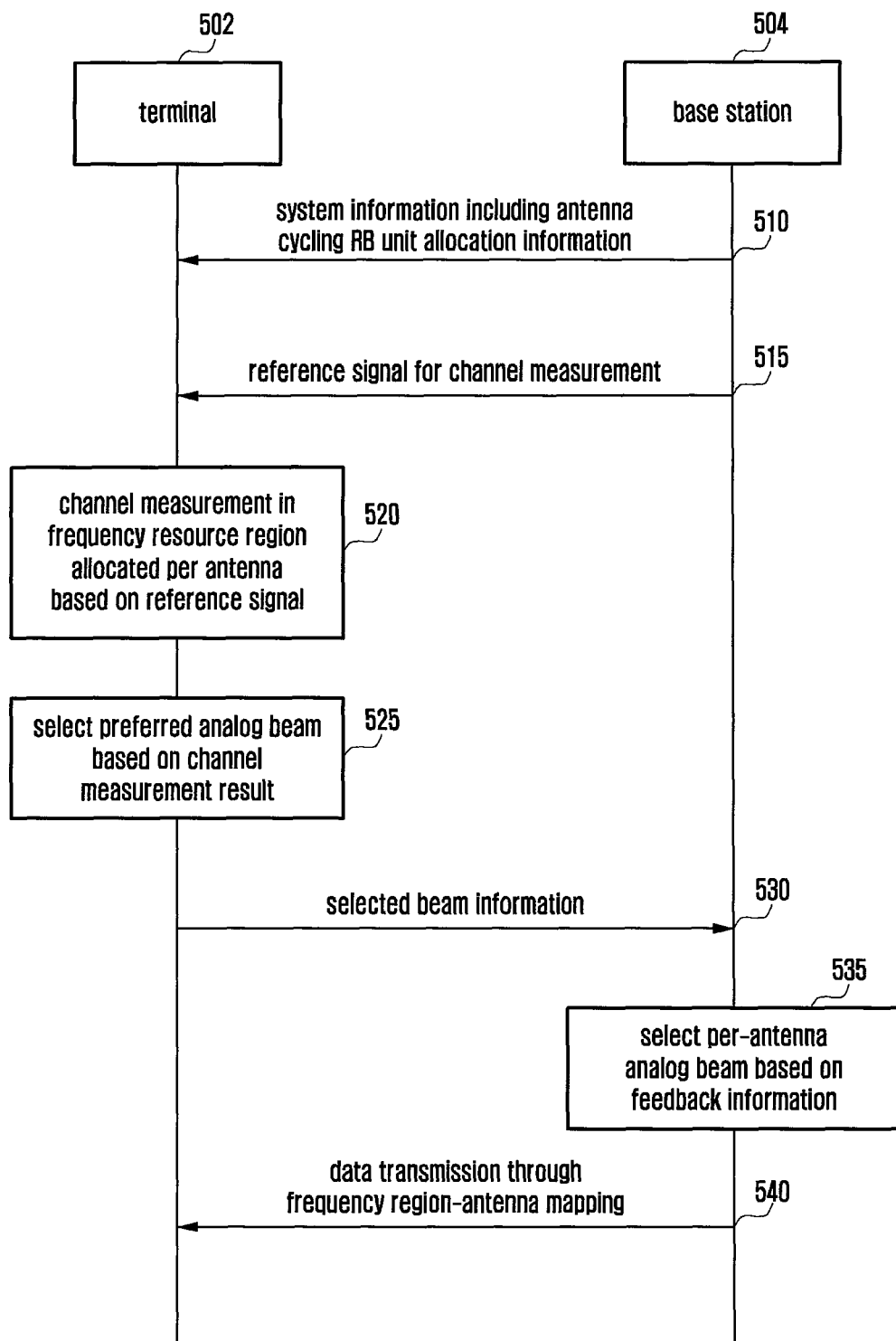
FIG. 5 is a signal flow diagram illustrating a hybrid beamforming-based Open-Loop MIMO operation scenario according to an embodiment of the present invention.

FIG. 5 is a signal flow diagram illustrating an operation scenario between a base station and a terminal for hybrid beamforming-based Open-Loop MIMO transmission proposed in the present invention.

Referring to FIG. 5, the terminal 502 and the base station 504 communicate signals based on the method proposed in an embodiment.

The base station 504 may transmit system information to the terminal 502 at step 510. The system information may include antenna Cycling RB unit information according to an embodiment. Since the method for mapping antennas and frequency resource regions is determined according to the antenna Cycling unit value as described with reference to FIGS. 3 and 4, the serving base station 504 transmits the antenna Cycling unit information to be applied for Open-Loop MIMO transmission to the users using the system information broadcast within the corresponding cell. Accordingly, all the users connected to the serving base station acquire the corresponding information and determine frequency resource regions to be mapped to the corresponding antennas based thereon.

For example, if the antenna Cycling unit information is carried using 2 bits, K=1, 2, 4, and 8 as follows.

2 bit system information b00:K=1, b01:K=2,b10:K=4,b11:K=8

Here, K is the value determined by the base station 504 according to the previous channel condition and corresponding cell environment and used for performance enhancement and optimization.

The base station 504 may transmit a Reference Signal (RS) for use by the terminal 502 in channel measurement based on the configured system information at step 515.

The terminal 502 may perform channel measurement on the frequency resource region allocated per antenna based on the received RS at step 520.

The terminal 502 may select a preferred analog beam based on the channel measurement result at step 525. In an embodiment, the terminal 502 may select at least one of preferred reception and transmission analog beams.

The terminal 502 may feedback the selected beam information to the base station 504 at step 530.

The base station 504 may configure the preferred analog beam per transmission antenna based on the feedback information at step 535.

The base station may transmit data through mapping between the frequency regions and antennas at step 540. In detail, the base station 504 may map the frequency region and antennas in unit of antenna Cycling RB and then transmit data by applying the Open-Loop beamforming.

According to an embodiment, the beamforming-based system may determine preferred transmission/reception analog beams using the RSs transmitted for use in channel measurement. This is the case even in the Open-Loop MIMO transmission. In an embodiment of the present invention, the terminal 502 checks the positions of the frequency resource regions of the respective array antennas based on the antenna Cycling unit value included in the system information, performs channel measurement on the corresponding frequency resource regions, and selects preferred analog beams for the respective array antennas. The selected analog beam information may be transmitted to the serving base station 504 through a feedback channel.

The serving base station 504 determines the per-antenna preferred analog beams based on the analog beam information transmitted by the respective users and configures phase shift values corresponding thereto. It may be possible to perform data transmission by mapping the frequency resource regions and the corresponding antennas according to the antenna Cycling unit value.

Figure 6:
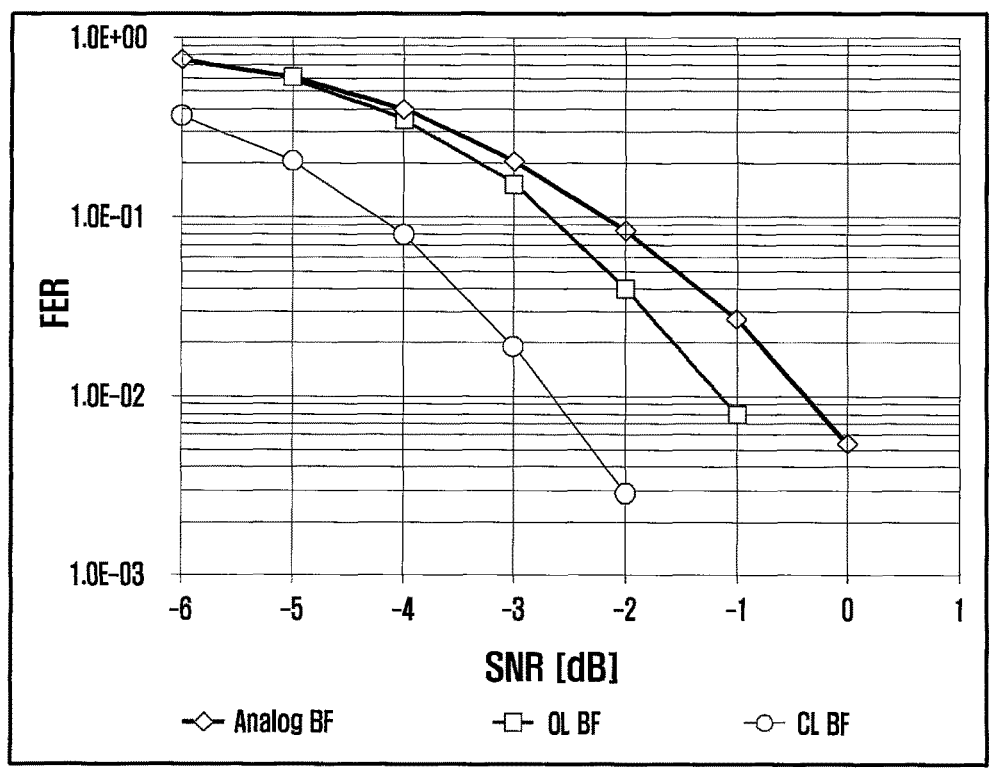
FIG. 6 is a graph illustrating a FER performance simulation result of the hybrid beamforming-based Open-Loop MIMO structure according to an embodiment of the present invention.

FIG. 6 is a graph illustrating the Open-Loop MIMO performance comparison result in the hybrid beamforming structure according to an embodiment.

Referring to FIG. 6, Analog beamforming (Analog BF) and Closed-Loop hybrid beamforming (CL BF) techniques are considered as comparison targets to be compared with the proposed Open-Loop MIMO transmission technique.

The drawing shows that the Open-Loop MIMO transmission technique proposed in an embodiment achieves more frequency diversity performance gain, by using multiple antennas and analog beams cyclically, in comparison with the Analog BF, which transmits data using one antenna, i.e. one analog beam. The performance simulation is made under the assumption of two transmission array antennas and one reception array antenna.

Figure 7:
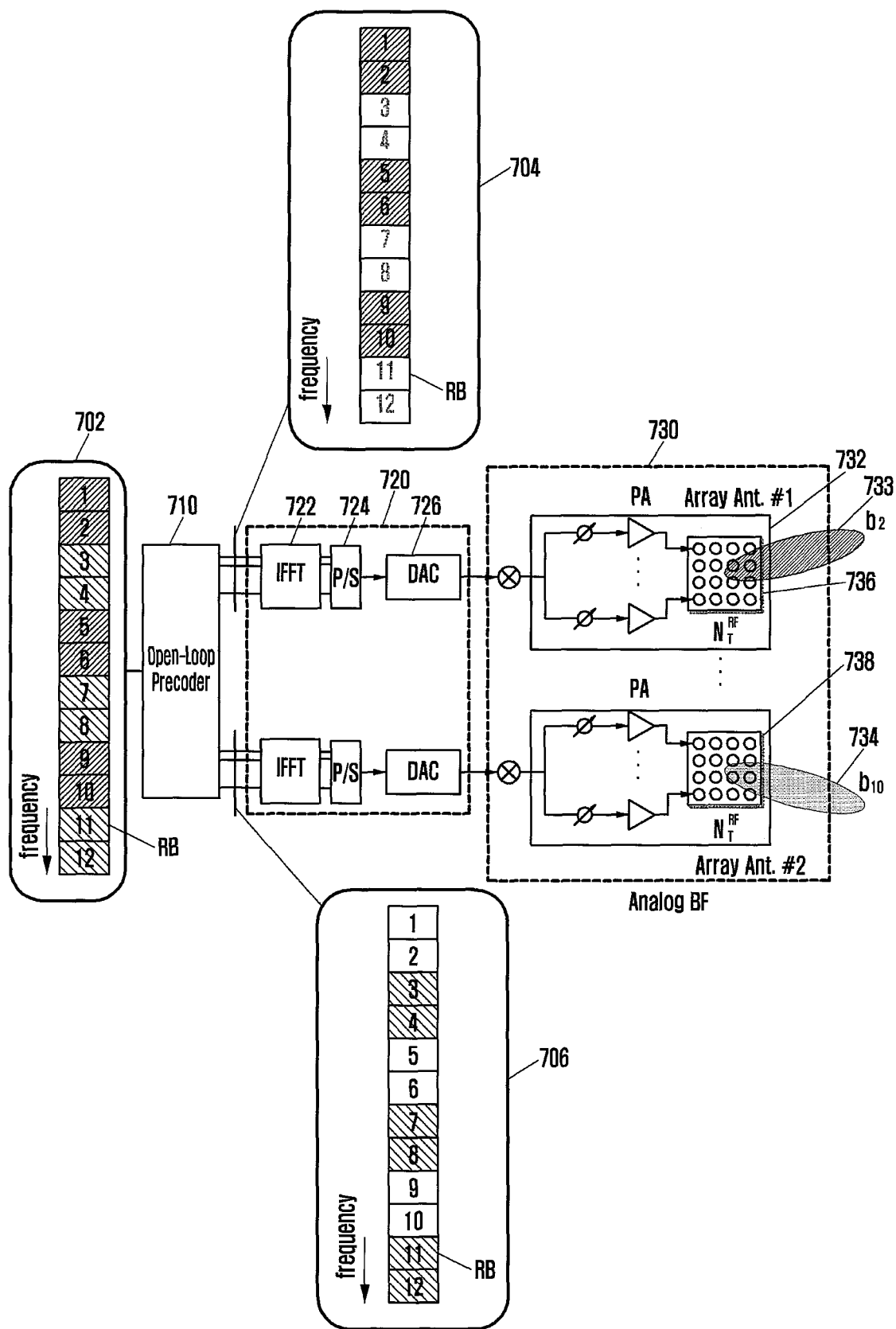
FIG. 7 is a diagram illustrating a hybrid beamforming-based Open-Loop MIMO transmission structure according to an embodiment of the present invention.

FIG. 7 is a diagram illustrating an exemplary Open-Loop MIMO transmission mechanism in the proposed hybrid beamforming structure according to an embodiment of the present invention.

Referring to FIG. 7, the transmitter of this embodiment may include an Open-Loop Precoder 710 for performing digital beamforming, an RF Chain 720, and an analog beamforming unit 730. The transmitter of this embodiment may include a base station. The base station may be referred to as a serving base station hereinafter.

The Open-Loop Precoder 710 may perform Open-Loop precoding according to an embodiment.

The RF Chain may include $N_T$ Inverse Fast Fourier Transformers (IFFT) 722, a Parallel-to-Serial (P/S) converter 724, and a Digital-Analog Converter (DAC) 726.

The analog beamforming unit 730 which performs analog beamforming includes $N_T$ array antennas, of which each 736 (or 738) includes $N_t^{RF}$ antenna elements, to perform analog beamforming on the transmission signals carrying data as denoted by reference numbers 733 and 735.

According to an embodiment of the present invention, it may be possible to perform mapping to the transmission resources as denoted by reference number 702 so as to allocate transmission resources to the corresponding antenna arrays through pre-IFFT as denoted by reference numbers 704 and 706.

The transmission resource allocation information may be transmitted to the terminal in the form of a bitmap or an index value. In detail, the resources allocated to the respective antenna arrays may be indicated in the form of a bitmap. It may be possible to inform the terminal of the Cycling unit using an index.

The Cycling unit may be determined in various manners depending on the embodiment and configured such that the distance between the frequency resources varies dynamically.

According to an embodiment, the base station may perform the Open-Loop and Closed-Loop transmissions selectively based on the channel information included in the CQI reported by the terminal.

Such a transmission resource allocation pattern may be fixed or selected dynamically depending on the channel condition.

The base station may exchange the resource allocation pattern information with neighboring base stations. The exchanged resource allocation pattern information may be selected to avoid collision of transmission resources per RS. Each base station may select a transmission resource pattern based on Cell ID.

According to an embodiment, the terminal may perform Open-Loop MIMO for uplink transmission using the resource allocation pattern identical with or different from the uplink pattern.

Figure 8:
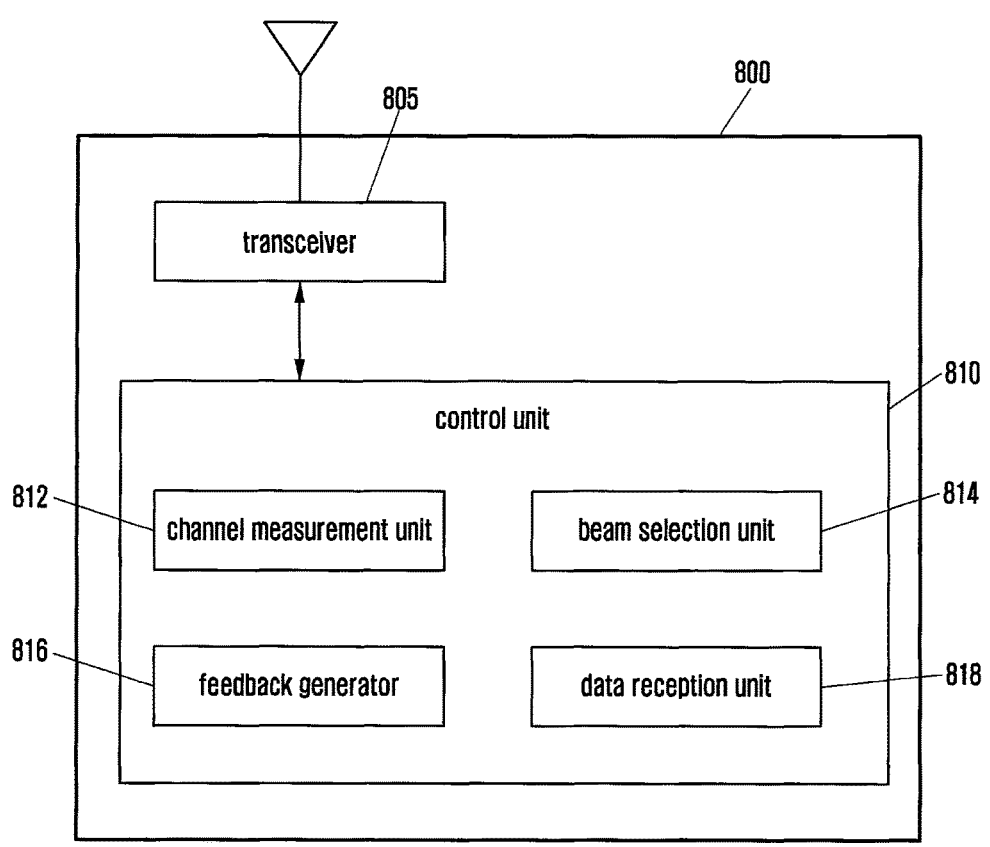
FIG. 8 is a block diagram illustrating a configuration of the terminal according to an embodiment of the present invention.

FIG. 8 is a block diagram illustrating a configuration of the terminal according to an embodiment of the present invention.

Referring to FIG. 8, the terminal 800 according to an embodiment may include a transceiver 805 and a control unit 810 for controlling the operation of the terminal 800.

The control unit 810 may include a channel measurement unit 812 for measuring channels based on the signals received from the base station.

The control unit 810 may include a beam selection unit 814 for selecting preferred beams based on the channel measurement result.

The control unit 810 may also include a feedback generator 816 for generating feedback information including the preferred beam information to be transmitted to the base station.

The control unit 810 may also include a data reception unit 818 for receiving data transmitted by the base station.

According to an embodiment of the present invention, the terminal may be a portable electronic device such as a mobile phone, a Personal Digital Assistant (PDA), a navigator, a digital broadcast receiver, and a Portable Multimedia Player (PMP).

A description is made of the method for allocating data transmission resource to be mapped according to predetermined antenna selection patterns and cycles among the hybrid beamforming-based Open-Loop MIMO transmission techniques proposed in the embodiments of the present invention. In more detail, a description is made of the method for selecting at least one of the frequency resources and Code resources as the transmission resources according to the per-antenna selection pattern. In an embodiment, it may be considered to transmit the signals in such a way of applying orthogonal codes to the digitally beamformed signals and then applying the analog beamforming to the orthogonal code-applied signals. In an embodiment, the number of orthogonal codes may be equal to the number of IFFTs of the transmitter, and various types of codes having the correlation of 0 there between may be applied. For example, a Walsh code may be applied.

Figure 9:
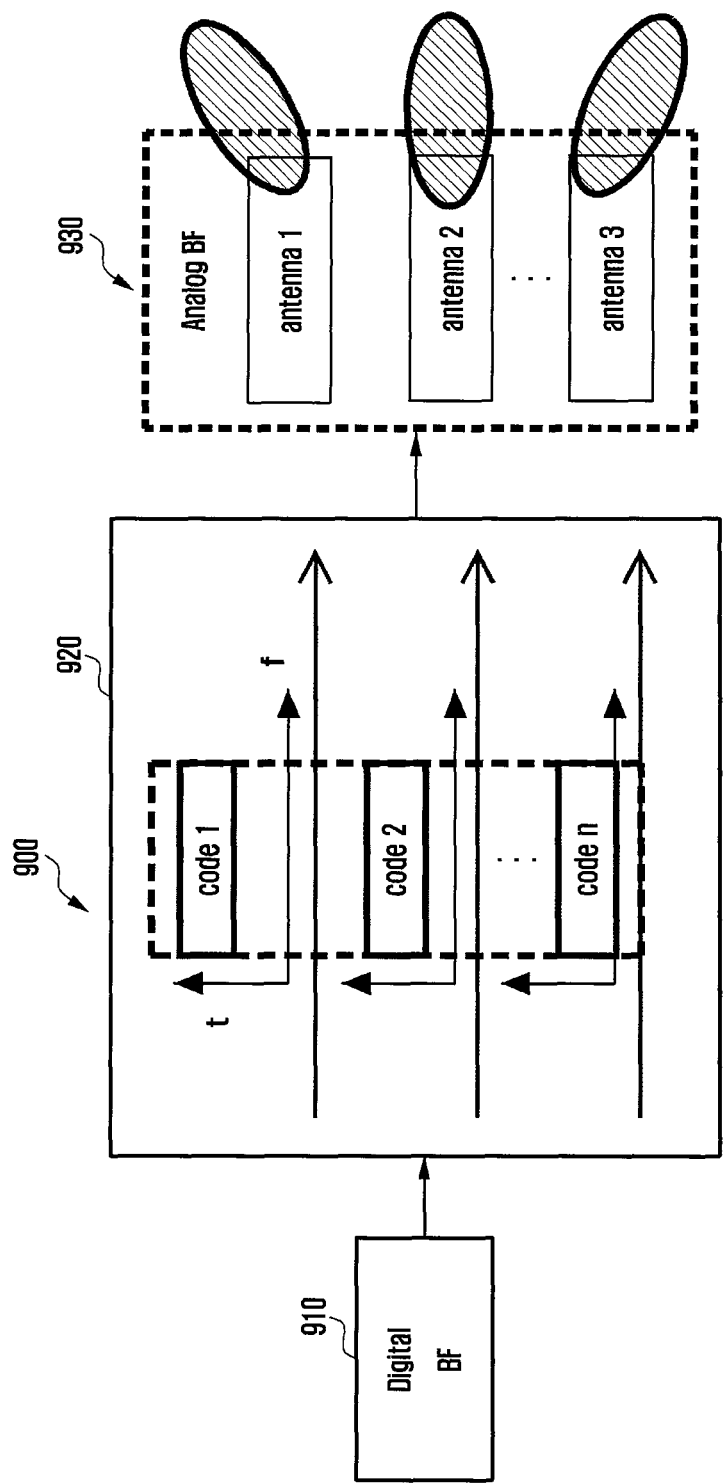
FIG. 9 is a diagram illustrating a method for applying code resources at a transmitter to which a hybrid beamforming is applied according to an embodiment of the present invention.

FIG. 9 is a diagram illustrating a method for applying code resources at a transmitter to which a hybrid beamforming is applied according to an embodiment of the present invention. The drawing shows a concept of the Code resource allocation method for Open-Loop MIMO transmission in the hybrid beamforming structure.

Referring to FIG. 9, the transmitter may include a digital beamforming unit 910, a code resource allocation unit 920, and an analog beamforming unit 930. The analog beamforming unit 930 may include an RF Chain. The digital beamforming unit 910 may be responsible for the function of the digital beamforming unit 110 of FIG. 1 and may include a MIMO encoder and a baseband precoder.

The signals digitally-beamformed by the digital beamforming unit 910 may be separated into the signals to be input to the respective array antennas. Afterward, the code resource allocation unit 920 may allocate corresponding codes to the separated signals such that the signals are spread on the frequency with the codes and then input to the analog beamforming unit. Next, the analog beamforming unit 930 performs analog beamforming on the signals spread with the codes; the beamformed signals being transmitted to the receiver.

The code division scheme is capable of maximizing resource allocation efficiency in comparison with a frequency division scheme. Typically, the total number of code resources is equal to the number of IFFTs used in the OFDM system and greater enough than the number of antennas so as to make it possible to allocate unique codes to the respective antennas. In detail, the transmitter may allocate unique codes to the respective antennas.

In an embodiment, if a signal beamformed with the code resource is received, the terminal checks the unique code of the received signal based on the correlation of each code to determine a beam having a direction suitable for signal transmission. By spreading the signals with codes, it is possible to transmit the signals across the whole frequency band and to achieve a frequency diversity effect without using the cyclic pattern in the channel estimation process.

If there is a need of channel estimation in a specific band on the frequency resource, it is possible to estimate channels in the specific band by adjusting the spreading factor of the code. In detail, if per-RB Channel estimation is necessary in the frequency domain, it is possible to perform the per-RB channel estimation by decreasing the spreading factor. However, the number of spreading factors may be equal to or greater than the total number of antennas. In an embodiment, the base station may adjust the spreading factor for channel estimation and, in detail, it may determine the frequency band scheduled for transmitting signals to the terminal and a spreading factor corresponding thereto and transmit the signal by applying the determined spreading factor, i.e. transmit the signal corresponding to the band to be measured.

Figure 10:
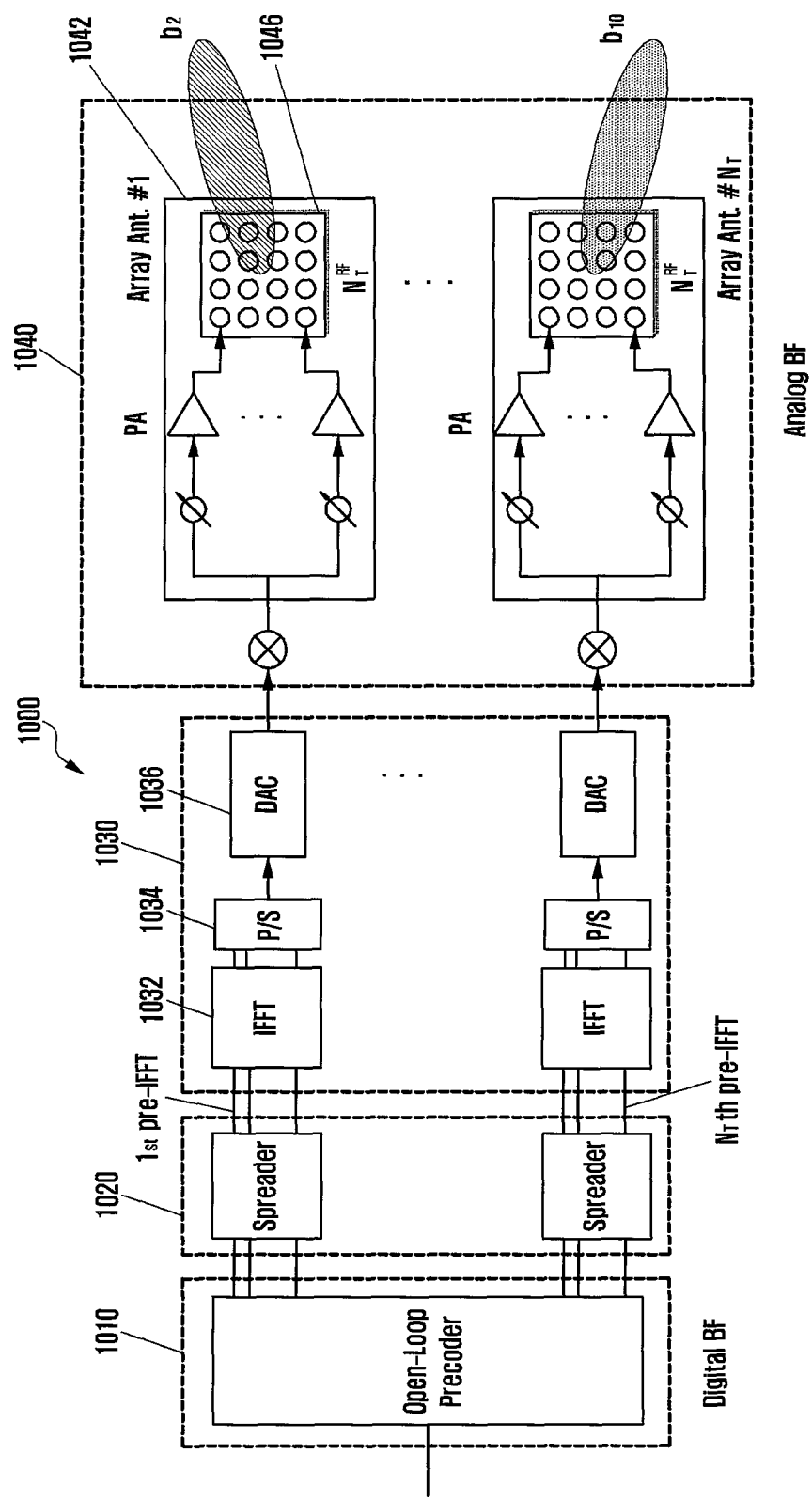
FIG. 10 is a diagram illustrating a configuration of a hybrid beamforming transmitter which uses code resources.

FIG. 10 is a diagram illustrating a configuration of a hybrid beamforming transmitter that uses code resources.

In the embodiment of FIG. 10, the transmitter 1000 may include at least one of a digital beamforming unit 1010, a spreader 1020, an RF Chain 1030, and an analog beamforming unit 1040.

The digital beamforming unit 1010 may include an Open-Loop precoder and, in more detail, a MIMO encoder and a baseband precoder.

The spreader 1020 may apply an orthogonal code to the beamformed signal. According to an embodiment, the transmitter 1000 may selectively apply a code for signal transmission based on the channel condition. In detail, if the channel condition value received from the receiver is equal to or greater than a threshold value, no code may be applied, and the receiver may assume that no code has been applied to the received signal when the transmitted channel condition value is equal to or greater than the threshold value.

The RF Chain 1030 may include $N_T$ Inverse Fast Fourier Transformers (IFFT) 1032, a Parallel-to-Serial (P/S) converter 1034, and a Digital-Analog Converter (DAC) 1036.

The analog beamforming unit 1040 includes $N_T$ array antennas, of which each 1042 includes $N_t^{RF}$ antenna elements 1046, to perform analog beamforming on the transmission signals carrying data.

The Open-Loop precoder performs digital beamforming on the input signals, which are separated per-antenna transmission signals, and the spreader 1020 spreads the per-antenna signals with the codes allocated to the respective antennas.

The RF Chain 1030 maps the spread signals to the frequency domain signals which are IFFTed and outputs the IFFTed signals to the array antennas of the analog beamforming unit 1040. The analog beamforming unit 1040 performs beamforming on each signal in a beam direction corresponding to at least one of the antennas and a unique code. In an embodiment, the unique code may be a code orthogonal in association with each antenna or resource region. In an embodiment, the beamforming scheme may be determined differently depending on the antenna or unique code.

Figure 11:
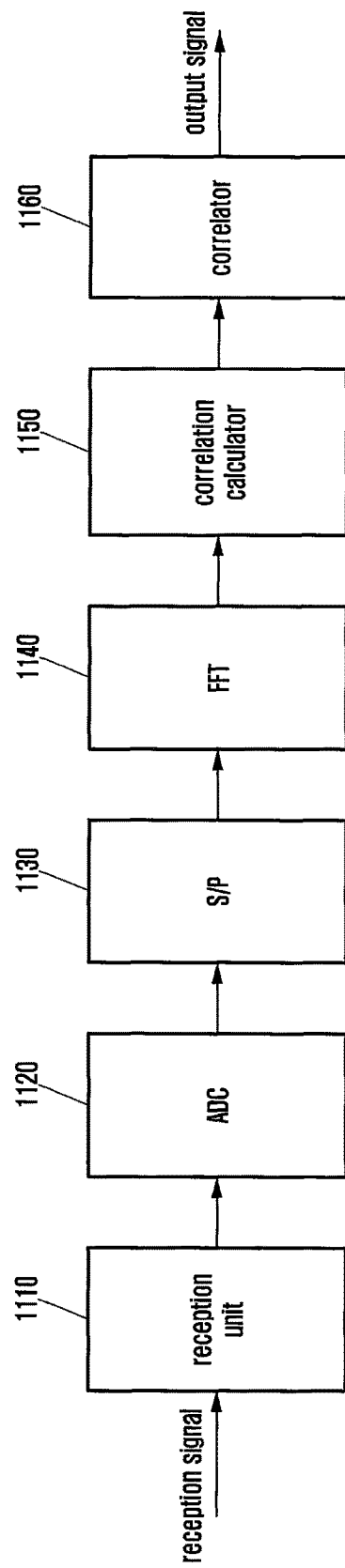
FIG. 11 is a diagram illustrating a configuration of a receiver according to an embodiment of the present invention.

FIG. 11 is a diagram illustrating a configuration of a receiver according to an embodiment of the present invention.

Referring to FIG. 11, the receiver 1100 according to an embodiment of the present invention may include at least one of a reception unit 1110, an Analog-Digital Converter (ADC) 1120, a serial-to-parallel (S/P) converter 1130, a Fast Fourier Transformer (FFT) 1140, a correlation calculator 1150, and a correlator 1160.

According to an embodiment, the reception unit 1110 may receive the signal transmitted by a transmitter. The reception unit 1110 may include a plurality of antennas to receive the signals transmitted by the transmitter.

According to an embodiment, the ADC 1120, the SP convertor 1130, and the FFT 1140 process the received signals by performing the operations corresponding to those of the corresponding components constituting the RF Chain of the transmitter.

According to an embodiment, the correlation calculator 1150 may calculate the correlation of the received signal. In detail, the correlation calculator 1150 may be an Inverse Fast Walsh-Hadamard Transformer (IFHT). It may analyze correlation of the received signal to process the signal.

According to an embodiment, the correlator 1160 may check the code applied to the received signal. It is possible to check the applied code by calculating the correlation of the code according to the length of the RB to which the code is applied. If the receiver knows the code applied to the antenna of the transmitter in advance, it can receive the signal using the code information. In detail, the correlator may be a partial correlator.

As described above, the receiver may process the received signal by means of the above components and generate an output signal for use in receiving the information transmitted by the transmitter.

Figure 12:
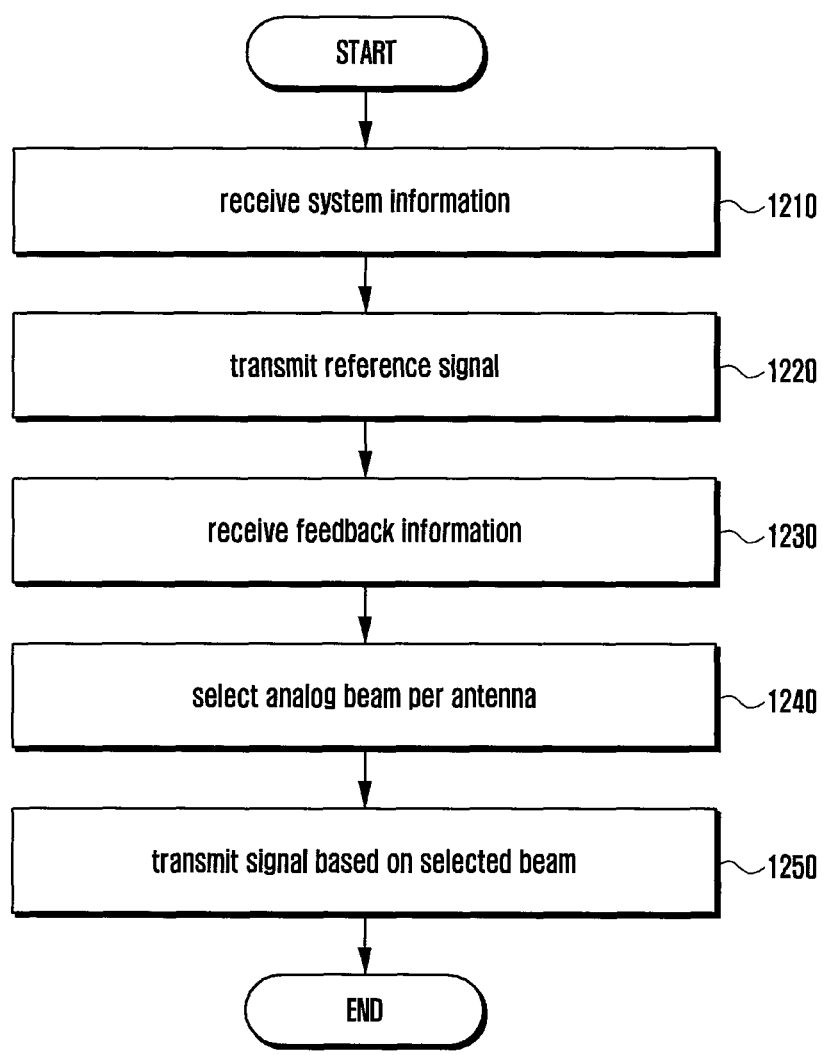
FIG. 12 is a flowchart illustrating a signal transmission/reception method of a transmitter according to an embodiment of the present invention.

FIG. 12 is a flowchart illustrating a signal transmission/reception method of a transmitter according to an embodiment of the present invention.

Referring to FIG. 12, the transmitter and receiver may communicate signals according to an embodiment.

The transmitter may transmit system information to the receiver at step 1210. In an embodiment, the system information may include antenna Cycling RB unit information. In an embodiment, an antenna-frequency resource region mapping scheme may be determined according to the antenna Cycling unit value, and the transmitter may transmit the antenna Cycling unit information to be applied for Open-Loop MIMO transmission to all receivers by means of the system information broadcast. According to an embodiment, the system information may include the information on the orthogonal code for use in transmitting signals. The orthogonal code information may include the information on the mapping relationship between at least one of the antennas and frequency resources and the code. In an embodiment, the transmitter may determine whether to apply a code depending on the channel condition. In detail, if the channel condition reported by the receiver is equal to or greater than a threshold value, no code may be applied. According to an embodiment, the code may have a mapping relationship with at least one of the antenna and resource region. It may also be possible to apply the code regardless of the antenna.

The transmitter may transmit a reference signal to the receiver based on the system information at step 1220. According to an embodiment of the present invention, at least one of the precoder and code may be applied to the reference signal.

The transmitter may receive feedback information corresponding to the reference signal from the receiver at step 1230. The feedback information may include the information on the beam selected by the receiver.

The transmitter may select per-antenna analog beam based on the feedback information at step 1240. In detail, the transmitter may select the per-antenna analog beam in a way of maximizing the channel transmission rate in consideration of the feedback information received from plural terminals.

The transmitter may transmit the signal to the receiver in such a way of applying the selected analog beams to the respective antennas at step 1250. The orthogonal code may be applied to the data signal in a manner identical with or different from that applied to the reference signal. Subsequently, the transmitter may transmit data by applying the Open-Loop beamforming. In an embodiment, the transmitter may determine the transmission scheme based on the feedback information received from the receiver.

Figure 13:
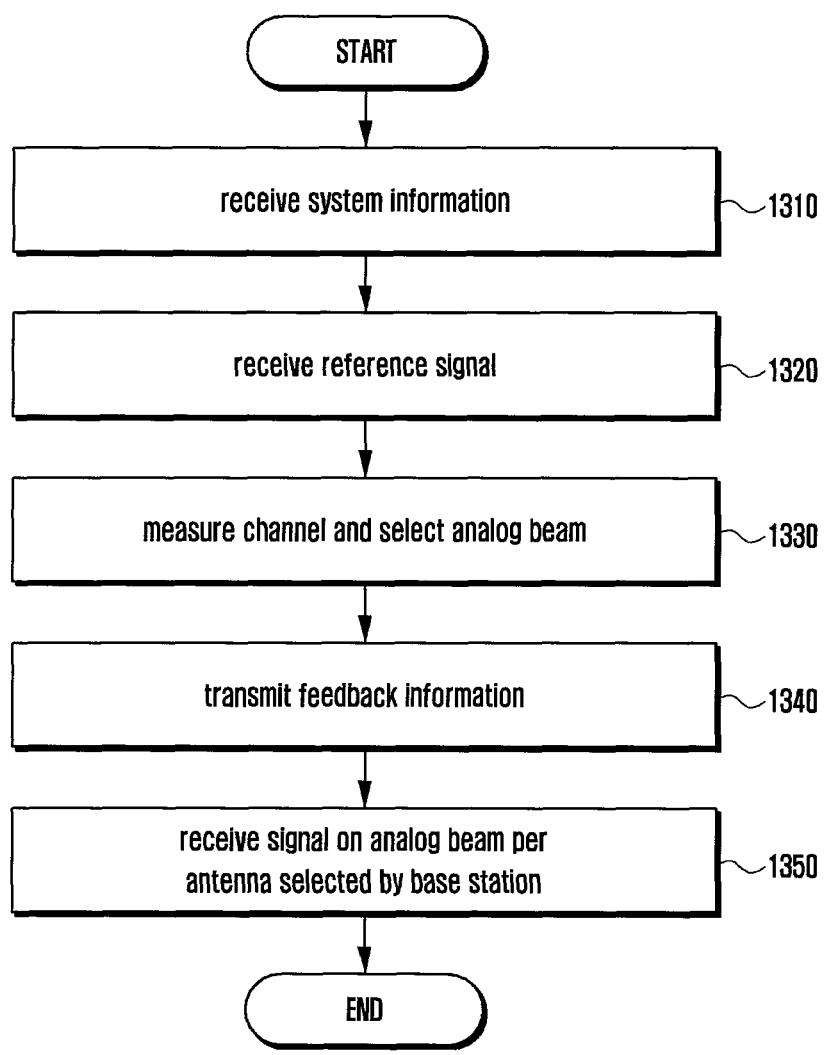
FIG. 13 is a flowchart illustrating a signal transmission/reception method of a receiver according to an embodiment of the present invention.

FIG. 13 is a flowchart illustrating a signal transmission/reception method of a receiver according to an embodiment of the present invention.

Referring to FIG. 13, the receiver may transmit/receive signals to/from the transmitter according to an embodiment.

The receiver may receive system information from the transmitter at step 1310. The system information may include antenna Cycling RB unit information. In an embodiment, an antenna-frequency resource region mapping scheme may be determined according to the antenna Cycling unit value, and the transmitter may transmit the antenna Cycling unit information to be applied for Open-Loop MIMO transmission to all receivers by means of the system information broadcast. According to an embodiment, the system information may include the information on the orthogonal code for use in transmitting signals. The orthogonal code information may include the information on the mapping relationship between at least one of the antennas and frequency resources and the code. In an embodiment, the transmitter may determine whether to apply a code depending on the channel condition. In detail, if the channel condition reported by the receiver is equal to or greater than a threshold value, no code may be applied. According to an embodiment, the code may have mapping relationship with at least one of the antenna and resource region. It may also be possible to apply the code regardless of the antenna.

The receiver may receive a reference signal from the transmitter based on the system information at step 1320. According to an embodiment of the present invention, at least one of the precoder and code may be applied to the reference signal, and the receiver may receive the reference signal based on the system information.

The receiver may perform channel measurement and select an analog beam suitable for the receiver based on the received reference signal at step 1330. In detail, the receiver may perform channel measurement in the frequency resource region allocated per antenna based on the received reference signal. The receiver may select a preferred analog beam based on the channel measurement result. In an embodiment, the receiver may select at least one of preferred reception and transmission analog beams.

The receiver may transmit feedback information corresponding to the reference signal to the transmitter at step 1340. The feedback information may include the information on the beam selected by the receiver.

The receiver may receive the signal to which the analog beam selected by the transmitter on the basis of the feedback information is applied at step 1350. The signal may include at least one of control information and data transmitted from the base station to the terminal.

It is to be appreciated that those skilled in the art can change or modify the embodiments without departing from the technical concept of this invention. Accordingly, it should be understood that above-described embodiments are essentially for illustrative purposes only and are not in any way for restriction thereto.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a transmitter in a communication system, the method comprising:
transmitting, to a receiver, system information including mapping information between at least one radio resource and a plurality of transmission antennas for transmitting a signal;
transmitting a reference signal on the at least one radio resource to the receiver based on the mapping information; and
receiving, from the receiver, feedback information including beam information on a beam selected by the receiver, the feedback information being generated based on the system information and the reference signal,
wherein the system information transmitted to the receiver includes information on an antenna cycling resource block (RB) unit on the at least one radio resource indicating that the plurality of transmission antennas are cyclically changed per at least one consecutive RB, and
wherein a mapping relationship between the plurality of transmission antennas and the at least one radio resource on a frequency domain is determined based on the antenna cycling RB unit.

2. The method of claim 1, wherein the system information comprises mapping information between at least one frequency resource region of the at least one radio resource and the plurality of transmission antennas, and
wherein transmitting, to the receiver, the reference signal comprises transmitting the reference signal via the plurality of transmission antennas based on the mapping information between the at least one frequency resource region of the at least one radio resource and the plurality of transmission antennas.

3. The method of claim 1, wherein the system information comprises mapping information between at least one code resource and the plurality of transmission antennas, and
wherein transmitting the reference signal comprises transmitting the reference signal via the plurality of transmission antennas based on the mapping information between the at least one code resource and the plurality of transmission antennas.

4. The method of claim 1, wherein the system information comprises information for consecutive frequency resources allocated to the plurality of transmission antennas, and
wherein the information for consecutive frequency resources allocated to the plurality of transmission antennas is determined based on channel information between the transmitter and the receiver.

5. The method of claim 1, further comprising:
determining at least one beam information for the plurality of transmission antennas based on the feedback information.

6. A method by a receiver of a communication system, the method comprising:

receiving, from a transmitter, system information including mapping information between at least one radio resource and at least one transmission antenna for transmitting a signal at the transmitter;
receiving a reference signal on the at least one radio resource from the transmitter based on the mapping information; and
transmitting, to the transmitter, feedback information including beam information on a beam selected by the receiver, the feedback information being generated based on the system information and the reference signal,
wherein the system information received from the transmitter includes information on an antenna cycling resource block (RB) unit on the at least one radio resource indicating that the plurality of transmission antennas are cyclically changed per at least one consecutive RB, and
wherein a mapping relationship between the plurality of transmission antennas and the at least one radio resource on a frequency domain is determined based on the antenna cycling RB unit.

7. The method of claim 6, wherein the system information comprises mapping information between at least one frequency resource region of the at least one radio resource and the at least one transmission antennas, and
wherein receiving, from the transmitter, the reference signal comprises receiving, from the transmitter, the reference signal based on the mapping information between the at least one frequency resource region of the at least one radio resource and the at least one transmission antennas.

8. The method of claim 6, wherein the system information comprises mapping information between at least one code resource and the plurality of transmission antennas, and
wherein receiving the reference signal comprises receiving the reference signal from the transmitter based on the mapping information between the at least one code resource and the plurality of transmission antennas.

9. The method of claim 6, wherein the system information comprises information for consecutive frequency resources allocated to the plurality of transmission antennas, and
wherein the information for consecutive frequency resources allocated to the plurality of transmission antennas is determined based on channel information between the transmitter and the receiver.

10. The method of claim 6, wherein at least one beam information for the plurality of transmission antennas is determined based on the feedback information.

11. A transmitter in a communication system, the transmitter comprising:
a transceiver comprising a plurality of transmission antennas; and
a processor configured to control the transceiver to:
transmit, to a receiver, system information including mapping information between at least one radio resource and the plurality of transmission antennas for transmitting a signal,
transmit a reference signal on the at least one radio resource to the receiver based on the mapping information, and
receive, from the receiver, feedback information including beam information on a beam selected by the receiver, the feedback information being generated based on the system information and the reference signal, wherein the system information transmitted to the receiver includes information on an antenna cycling resource block (RB) unit on the at least one radio resource indicating that the plurality of transmission antennas are cyclically changed per at least one consecutive RB, and
wherein a mapping relationship between the plurality of transmission antennas and the at least one radio resource on a frequency domain is determined based on the antenna cycling RB unit.

12. The transmitter of claim 11, wherein the system information comprises mapping information between at least one frequency resource region of the radio resource and the plurality of transmission antennas, and
wherein the processor is further configured to control the transceiver to transmit the reference signal via the plurality of transmission antennas based on the mapping information between the at least one frequency resource region of the at least one radio resource and the plurality of transmission antennas.

13. The transmitter of claim 11, wherein the system information comprises mapping information between at least one code resource and the plurality of transmission antennas, and
wherein the processor is further configured to control the transceiver to transmit the reference signal via the plurality of transmission antennas based on the mapping information between the at least one code resource and the plurality of transmission antennas.

14. The transmitter of claim 11, wherein the system information comprises information for consecutive frequency resources allocated to the plurality of transmission antennas, and
wherein the information for consecutive frequency resources allocated to the plurality of transmission antennas is determined based on channel information between the transmitter and the receiver.

15. The transmitter of claim 11, wherein the processor is further configured to determine at least one beam information for the plurality of transmission antennas based on the feedback information.

16. A receiver in a communication system, the receiver comprising:
a transceiver configured to transmit and receive a signal; and
a processor configured to control the transceiver to:
receive, from a transmitter, system information from including mapping information between at least one radio resource and a plurality of transmission antennas for transmitting the signal at the transmitter,
receive a reference signal on the at least one radio resource from the transmitter based on the mapping information, and
transmit, to the transmitter, feedback information including beam information on a beam selected by the receiver, the feedback information being generated based on the system information and the reference signal,
wherein the system information, received from the transmitter includes information on an antenna cycling resource block (RB) unit on the at least one radio resource indicating that the plurality of transmission antennas are cyclically changed per at least one consecutive RB, and wherein a mapping relationship between the plurality of transmission antennas and at least one radio resource on a frequency domain is determined based on the antenna cycling RB unit.

17. The receiver of claim 16, wherein the system information comprises mapping information between at least one frequency resource region of the at least one radio resource and the plurality of transmission antennas, and wherein the processor is further configured to control the transceiver to receive, from the transmitter, the reference signal based on the mapping information between frequency resource region of the at least one radio resource and the plurality of transmission antennas.

18. The receiver of claim 16, wherein the system information comprises mapping information between at least one code resource and the plurality of transmission antennas, and wherein the processor is further configured to control the transceiver to receive the reference signal from the transmitter based on the mapping information between the at least one code resource and the at plurality of transmission antennas.

19. The receiver of claim 16, wherein the system information comprises information for consecutive frequency resources allocated to the plurality of transmission antennas, and wherein the information for consecutive frequency resources allocated to the plurality of transmission antennas is determined based on channel information between the transmitter and the receiver.

20. The receiver of claim 16, wherein at least one beam information for the plurality of transmission antennas is determined based on the feedback information.

* * * * *